(12) United States Patent
Kulkarni et al.

(10) Patent No.: US 11,182,546 B2
(45) Date of Patent: Nov. 23, 2021

(54) CREATING, EDITING, AND SAVING AD HOC GRIDS IN SMART FORMS

(71) Applicant: Oracle International Corporation, Redwood Shores, CA (US)

(72) Inventors: Prasad Kulkarni, San Ramon, CA (US); Deepak Sharma, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 15 days.

(21) Appl. No.: 16/368,289

(22) Filed: Mar. 28, 2019

(65) Prior Publication Data

US 2019/0220510 A1    Jul. 18, 2019

Related U.S. Application Data

(62) Division of application No. 14/865,810, filed on Sep. 25, 2015, now abandoned.

(60) Provisional application No. 62/055,443, filed on Sep. 25, 2014.

(51) Int. Cl.
*G06F 40/18* (2020.01)
*G06Q 10/06* (2012.01)

(52) U.S. Cl.
CPC .............. *G06F 40/18* (2020.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 6,317,750 | B1 * | 11/2001 | Tortolani | ............... G06F 40/18 715/853 |
| 2004/0181378 | A1 * | 9/2004 | Gilmore | ................. G06Q 10/06 703/6 |
| 2006/0010118 | A1 | 1/2006 | Sattler et al. | |
| 2007/0233811 | A1 | 10/2007 | Rochelle et al. | |
| 2015/0199328 | A1 * | 7/2015 | Danziger | ................ G06F 40/18 715/219 |
| 2016/0092424 | A1 | 3/2016 | Kulkarni et al. | |

OTHER PUBLICATIONS

Frankie Li, "Hyperion Smart View Demo 11.1.2.3", published on Dec. 3, 2013, youtube.com, 0:00-6:44. (Year: 2013).*
Matt Milella, "Smart View 11.1.2.2.300 function builder", published on Oct. 1, 2012, youtube.com, 0:00-1:42. (Year: 2012).*
Ben Joan, "Difference Between XML and XLS," DifferenceBetween. net Jul. 4, 2011, pp. 1-5 (2011).

* cited by examiner

*Primary Examiner* — Ariel Mercado
(74) *Attorney, Agent, or Firm* — Miller Nash LLP

(57) ABSTRACT

A computer-implemented method can include creating an adhoc grid responsive to a user request, adding an extra row to the adhoc grid responsive to another user request, entering into the extra row a cell formula specified by the user, and saving the adhoc grid as a smart form, wherein the smart form is a form that is configured to have adhoc grids that contain grid labels as well as business calculations that are based on cell formulas.

7 Claims, 7 Drawing Sheets

| | A | B | C | D |
|---|---|---|---|---|
| 1 | expenses | p1 | p2 | p3 |
| 2 | tel | $ | $ | $ |
| 3 | internet | $ | $ | $ |
| 4 | DataCon | $ | $ | $ |
| 5 | Total | SUM(b2:b4) | SUM(c2:c4) | SUM(d2:d4) |
| 6 | | SUM(b2:b3) | SUM(c2:c3) | SUM(d2:d3) |

200

| | A | B | C | D | E | F | G | H |
|---|---|---|---|---|---|---|---|---|
| 1 | | | FY13 | FY13 | FY13 | FY14 | | |
| 2 | | | Jan | Feb | Mar | Apr | POV [Book1] ▶ | |
| 3 | entity1 | account1 | #Missing | #Missing | 3 | 10 | Current ▶ | |
| 4 | entity1 | account2 | #Missing | #Missing | 3 | 10 | BU Version_1 ▶ | |
| 5 | entity1 | account3 | 3 | #Missing | 3 | 10 | Local | |
| 6 | entity1 | account4 | 4 | #Missing | 6 | 10 | Refresh | |
| 7 | entity1 | account5 | 5 | #Missing | 3 | 20000 | | |
| 8 | entity2 | account1 | 6 | #Missing | 3 | 20000 | | |
| 9 | entity2 | account2 | 7 | 1 | 3 | 20000 | | |
| 10 | entity2 | account3 | 8 | 1 | 3 | #Missing | | |
| 11 | entity2 | account4 | 9 | 1 | 3 | #Missing | | |
| 12 | entity2 | account5 | 10 | 1 | 3 | #Missing | | |
| 13 | | | | | | | | |
| 14 | | | | | | | | |

FIG. 3

| | f$_x$ | =SUM(D10:D12) | | | | | | |
|---|---|---|---|---|---|---|---|---|
| | A | B | C | D | E | F | G | H |
| 1 | | | FY13 | FY13 | FY13 | FY14 | | POV [Book1] ▶ |
| 2 | | | Jan | Feb | Mar | Apr | | Current ▶ |
| 3 | entity1 | account1 | #Missing | #Missing | 3 | 10 | | BU Version_1 ▶ |
| 4 | entity1 | account2 | #Missing | #Missing | 3 | 10 | | Local |
| 5 | entity1 | account3 | 3 | #Missing | 3 | 10 | | Refresh |
| 6 | entity1 | account4 | 4 | #Missing | 6 | 10 | | |
| 7 | entity1 | account5 | 5 | #Missing | 3 | 20000 | | |
| 8 | entity2 | account1 | 6 | #Missing | 3 | 20000 | | |
| 9 | entity2 | account2 | 7 | #Missing | 3 | 20000 | | |
| 10 | entity2 | account3 | 8 | 1 | 3 | #Missing | | |
| 11 | entity2 | account4 | 9 | 1 | 3 | #Missing | | |
| 12 | entity2 | account5 | 10 | 1 | 3 | #Missing | | |
| 13 | entity2 | accountx | 18 | =SUM(D10:D12) | | | | |
| 14 | | | | | | | | |

CREATING, EDITING, AND SAVING AD HOC GRIDS IN SMART FORMS

CROSS-REFERENCE TO RELATED APPLICATION

This application is a divisional of U.S. patent application Ser. No. 14/865,810, titled "CLIENT SIDE CALCULATIONS" and filed Sep. 25, 2015, which claims the benefit of U.S. Provisional Patent Application No. 62/055,443, titled "CLIENT SIDE CALCULATIONS" and filed on Sep. 25, 2014, the content of which is hereby fully incorporated by reference herein.

BACKGROUND

ORACLE HYPERION Planning (referred to herein simply as Planning) is a centralized, MICROSOFT Office and Web-based planning, budgeting and forecasting solution that integrates financial and operational planning processes and improves business predictability. Planning may reduce planning, budgeting, and forecasting cycles by weeks or months and also improve accuracy of plans and forecasts.

In current implementations, a Planning user needs to enter grid labels in order to save adhoc grids with EXCEL Formulas. Also in current implementations, a Planning user can only enter EXCEL Formulas for rows and columns created by grid labels.

Thus, there remains a need for greater flexibility and functionality for Planning users with regard to EXCEL Formulas.

BRIEF DESCRIPTION OF THE DRAWINGS

FIG. 3 illustrates an example of creating an adhoc grid in accordance with certain embodiments of the disclosed technology.

FIG. 5 illustrates an example of providing an EXCEL cell formula to the adhoc grid in accordance with certain embodiments of the disclosed technology.

DETAILED DESCRIPTION OF THE EMBODIMENTS

Figure 1:
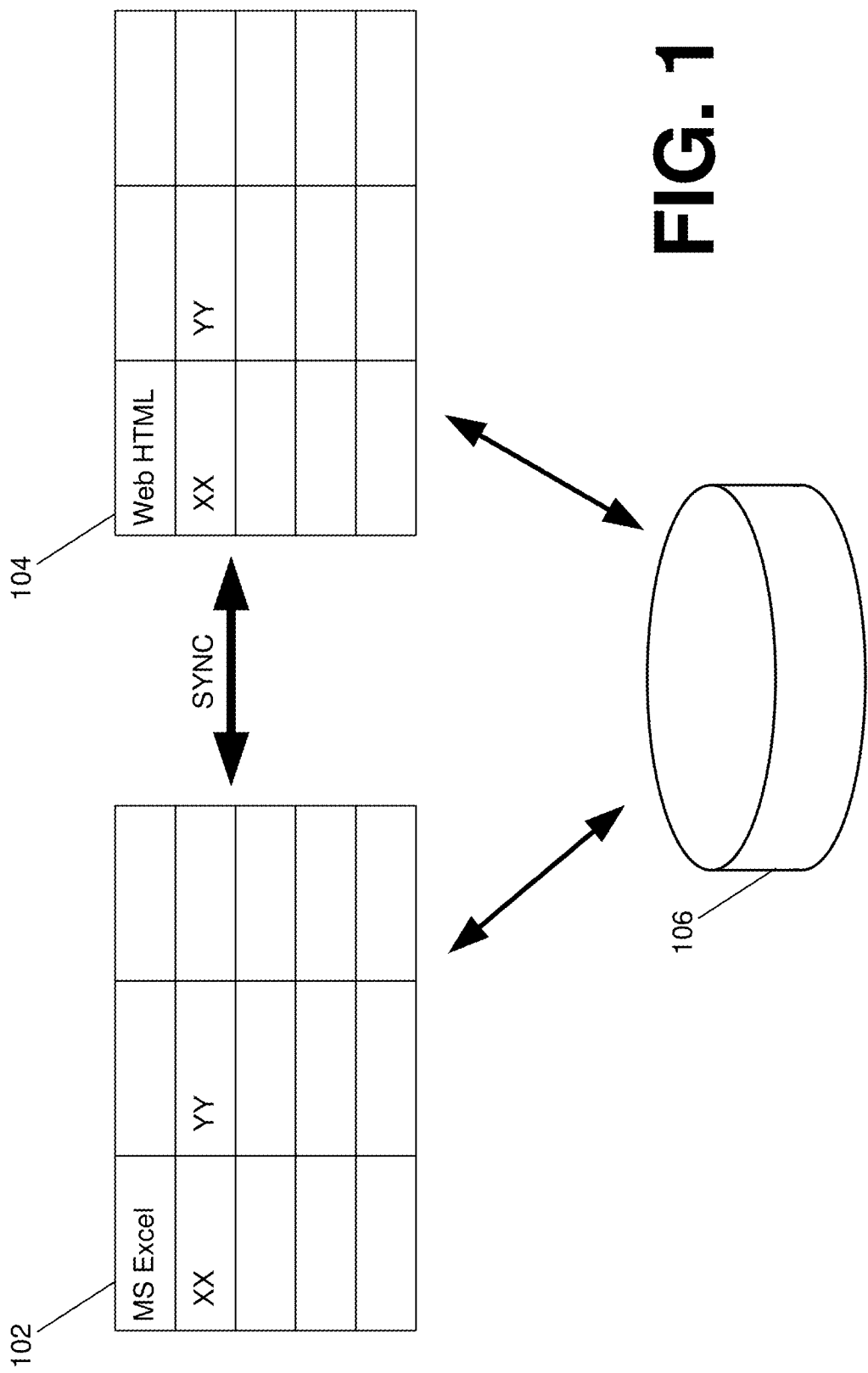
FIG. 1 illustrates an example of data synchronization in accordance with certain embodiments of the disclosed technology.

Embodiments of the disclosed technology generally allow planning users to execute calculations on the client side without adding members to Planning metadata. Users may define labels (referred to herein as Grid Labels) in place of actual members in adhoc forms. These labels may act as placeholders for entering EXCEL formulas, which can be defined in the SMART VIEW UI (e.g., adhoc forms) using EXCEL syntax. Formulas may be supported for rows or/and columns at the cell level.

Embodiments of the disclosed technology are generally directed to a new Planning feature that advantageously allows Planning users to execute calculations on a client side without adding members to planning metadata. Run time client side calculations may be supported by both SMART VIEW UI and Planning Web UI. In embodiments involving the SMART VIEW UI, client side calculations may be executed completely on a client machine without round trip to the server, thus leveraging the native EXCEL calculation engine. The entry point for adding formulas may be the SMART VIEW UI. The client side calculation feature may advantageously support formulas for rows and/or columns at the cell level. The client side calculation feature implementation may be based on using Grid Labels along with SMARTFORMS.

As used herein, Grid Labels generally refer to labels on a grid that are used in place of actual members. Grid labels may be entered manually by end users in place of real members in adhoc mode. Grid Labels names generally cannot match any actual member name in Planning Metadata or any member alias for a certain alias table. Grid Labels generally do not have other dimension properties, and they are generally neither visible in Planning Dimension Editor nor pushed to Essbase. Grid Labels may be used to advantageously provide placeholders in a grid for entering EXCEL formulas for corresponding data cell intersections. Grid Labels may be manually entered by a user in EXCEL UI, for example. Data cells created by the intersection of real members with Grid Labels are referred to herein as calculated cells.

As used herein, SMARTFORM generally refers to a new type of Planning form that has new functionality not supported by regular forms and created by Using SMART-VIEW UI based on adhoc grids. SMARTVIEW UI may provide an option to save adhoc grids as a SMARTFORM or as a regular adhoc grid. SMARTFORMS may support grid labels along with EXCEL Formulas. EXCEL formulas and grid labels along with empty rows/columns may be stored on a Planning server as a part SMARTFORM definition.

SMARTFORMS may also support extended EXCEL Formatting features including cells merging, and a document title. SMARTFORMS may be used by end users in a similar manner as regular Planning forms on Planning Web UI and in SMART VIEW UI. In contrast to regular adhoc grids, SMARTFORMS may be opened for Adhoc analysis only by Planning users having Admin or Smart Slice Creator roles. Adhoc mode for SMARTFORMS is generally considered as SMARTFORMS design mode, so adhoc mode for SMART-FORMS is generally similar to Planning Web UI form design functionality that is not opened for end users. Planning form design UI may be used to assign Business rules to SMARTFORMS.

SMARTFORMS may advantageously support multiple EXCEL formula rows/columns as well as empty rows/columns. After a user has specified EXCEL formulas for grid labels, the user can refresh the grid and modify data values in the grid. Calculated cell values may be automatically recalculated without round trip to the server. The user may submit modified data values to the server, and grid labels—along with corresponding formulas—may be retained during refresh or submit operations. A user may delete or modify grid labels in adhoc mode and use "save as" functionality while saving modified Smart Forms.

One embodiment of the invention includes a web spreadsheet in html and an EXCEL spreadsheet such as that from MICROSOFT Corp. The Web spreadsheet may be running on client computer1, such as a tablet or other mobile device, and the EXCEL spreadsheet may be running on client computer2, such as a PC. The choice of client computer is for illustration purposes only and could be vice versa or any combination thereof. In this embodiment, the web spreadsheet and the EXCEL spreadsheet are synchronized such that a change in one is reflected dynamically in the other. Both the web spreadsheet and EXCEL spreadsheet get their data and metadata from a common database or other storage server. The formula calculations are done on the client side for the web spreadsheet and on the client side for EXCEL spreadsheet using common data stored on the database or other server, e.g., Planning server. The formulas are kept synchronized, in part by using adhoc grids and Grid labels. Grid Labels are some labels on an adhoc grid used in place of actual members. Grid labels are needed in order to save the adhoc grid with EXCEL formulas. Users can create SMARTFORMS by saving adhoc grids containing grid labels with provided EXCEL formulas on the Planning server.

FIG. 1 illustrates an example of data synchronization in accordance with certain embodiments of the disclosed technology. In the example, data synchronization may occur between an EXCEL spreadsheet 102 and a Web spreadsheet 104 such that data and metadata may be placed in a single repository 106.

Among the various advantages afforded by such implementations are flexibility and robustness that provide users having different configurations the ability to work with whatever spreadsheet application is most convenient (and, in certain cases, even possible) for their individual setups. For example, certain users may only have access to—or are only authorized/enabled to use—the EXCEL spreadsheet 102 while other users may only have access to—or are only authorized/enabled to use—the Web spreadsheet 104. Such implementations also allow users to execute these calculations on the client side without adding members to the Planning metadata. Alternatively or in addition thereto, a single user may wish to work with both the EXCEL spreadsheet 102 and the Web spreadsheet 104, e.g., at different physical locations or using different accounts/logins.

Another advantage afforded by implementations of the disclosed technology is flexibility in terms of actual calculations. That is, different formulas in the EXCEL spreadsheet 102 and Web spreadsheet 104 may be applied to the same cell, thereby maintain consistency of the underlying data. For example, a user may apply a first formula to a cell using the EXCEL spreadsheet 102 and the same user or a different user may apply a second formula to the cell (e.g., the same data) using the Web spreadsheet 104.

In one embodiment, when SMARTFORMS are opened by end users Planning applies metadata security and some members may be filtered out from the grid. For a relative cell coordinate referenced in the formulas, Planning Provider may automatically recalculate original cell coordinates referenced in EXCEL formula like A3, B4 . . . to the new effective cells coordinates that can be different from original because of security filtering. For example, cell coordinate referenced as "F5" in original EXCEL Formula may be mapped to cell Coordinate "F3" because of row suppression.

Figure 2:
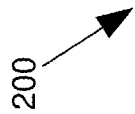
FIG. 2 illustrates an example of a spreadsheet in which each row may have different access privileges based on the user in accordance with certain embodiments of the disclosed technology.

FIG. 2 ("Relative Formula adjustment based on access to data per row") illustrates an example of a spreadsheet 200 in which each row may have different access privileges based on the user. In the example, row 1, cols. B, C, and D of the spreadsheet 200 represent expenses for persons p1, p2, and p3. Col. A, rows 2-4 represent what those telecommunication expense are (e.g., telephone, Internet, and Datacon). Row 5 represents the total of telecommunication expenses (telephone use, Internet use, and mobile data use) for each person p1-p3. These may be represented by an EXCEL formula, which in FIG. 2 is abbreviated for readability (e.g., SUM(b2:b4)).

While certain people, such as the company's vice president (VP), may have access to all rows (e.g., R1-R5), in this example a lower level manager may not have access to Row 4, Datacon use expenses. The manager will thus only have access to rows 1, 2, 3, and 5 with row 4 either missing or redacted out. EXCEL will typically give errors in row 5 totals for cols. B, C, and D as row 4 is now missing. For the manager, however, the embodiment re-writes the formulas in row 5 to take in to account the missing row 4 data so the manager can see his total. Row 6, cols. B, C, and D show the new re-written formula which will replace the totals in row 5 for the manager. Thus, the VP can see the correct totals for all expenses and the manager can see the total for those particular expenses he has access to. If a team lead should have only access to the telephone and internet expenses (e.g., not row 4 data), then row 5 can be automatically replaced with row 6 showing the sum of b2-b3 and row 4 can be blacked out for the team lead. Thus, the system automatically adjusts for who has access to which data.

FIG. 3 illustrates an example of creating an adhoc grid 300 in accordance with certain embodiments of the disclosed technology. The adhoc grid 300 may be created by a user either by opening a Planning form for adhoc analysis or starting an adhoc analysis at a Plan type level.

Figure 4:
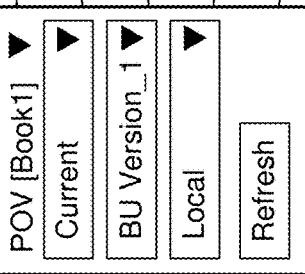
FIG. 4 illustrates an example of adding a row to the adhoc grid in accordance with certain embodiments of the disclosed technology.

FIG. 4 illustrates an example of adding a row 402 to the adhoc grid 300 in accordance with certain embodiments of the disclosed technology. A user may add the extra row 402 by typing in "entity2" for Entity dimension and label "acountX" for account dimension, thus creating a grid label along with a row of calculated cells D13:F13, for example.

FIG. 5 illustrates an example of providing an EXCEL cell formula 502 to the adhoc grid 300 in accordance with certain embodiments of the disclosed technology. A user may provide the EXCEL cell formula 502 for cells C13:F13 created by the intersection of real column dimension members with a label's row 13. EXCEL may automatically apply formulas for calculated cells once the user moves the cursor to a different cell. For example, a user who already entered a formula for cell C13 may type in a formula for the cell D13.

Figure 6:
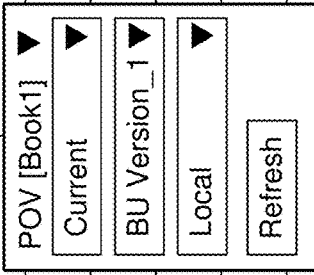
FIG. 6 illustrates an example of a cell tooltip in the adhoc grid in accordance with certain embodiments of the disclosed technology.

FIG. 6 illustrates an example of a cell tooltip 602 in the adhoc grid 300 in accordance with certain embodiments of the disclosed technology. A user may find formula contents in an EXCEL formula bar, which can be displayed as a cell's tooltip.

Figure 7:
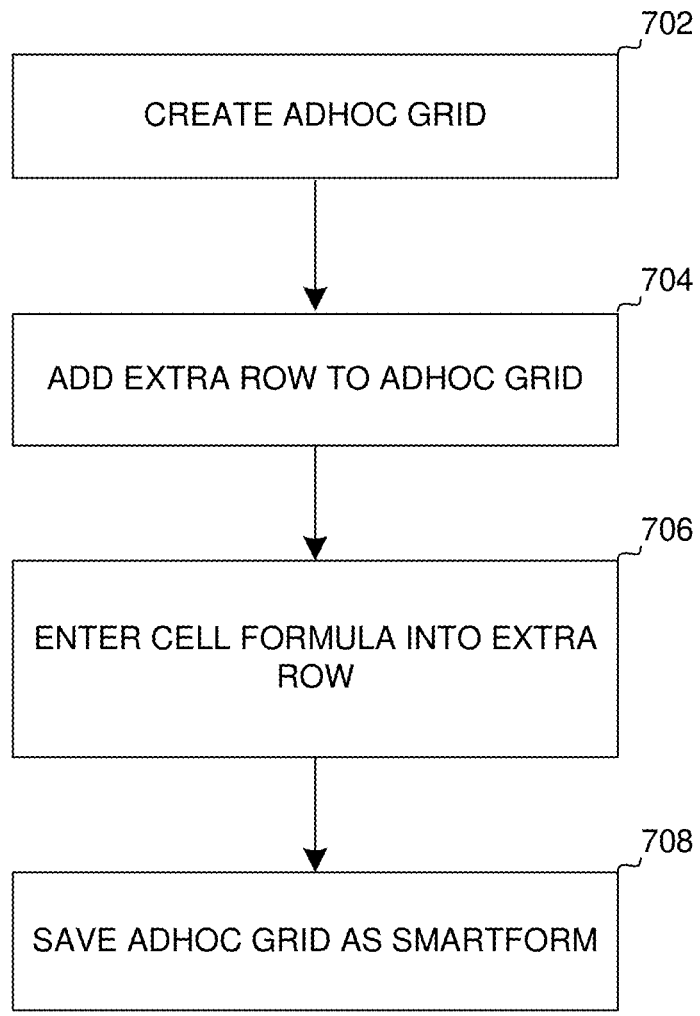
FIG. 7 illustrates an example of a computer-controlled method in accordance with certain embodiments of the disclosed technology.

FIG. 7 illustrates an example of a computer-controlled method 700 in accordance with certain embodiments of the disclosed technology. At 702, an adhoc grid is created (e.g., responsive to receiving from a user a request to create the adhoc grid). At 704, an extra row is added to the adhoc grid (e.g., responsive to receiving from the user a request to add the extra row to the adhoc grid). At 706, a cell formula may be entered into the extra row (e.g., responsive to user input specifying the cell formula). At 708, the adhoc grid may be saved as a SMARTFORM.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts. Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A computer-implemented method, comprising:
    creating a first adhoc grid by opening a server-based form having data for adhoc analysis responsive to receiving from a first user a request to create the first adhoc grid;
    adding an extra row to the first adhoc grid responsive to receiving from the first user a request to add the extra row to the first adhoc grid, wherein adding the extra row to the first adhoc grid includes entering a value for a first entity dimension;
    entering a cell formula into the extra row responsive to first user input specifying the cell formula, wherein the adding and entering have no effect on the data stored on the server; and
    saving the first adhoc grid as a smart form on the server separate from the server-based form, wherein the smart form is a form configured to have adhoc grids that contain grid labels and calculations that are based at least in part on cell formulas.

2. The computer-implemented method of claim 1, wherein creating the first adhoc grid includes starting an analysis at a first level.

3. The computer-implemented method of claim 1, wherein adding the extra row to the first adhoc grid further includes entering a value for a first account dimension.

4. The computer-implemented method of claim 1, wherein entering the cell formula into the extra row includes using a spreadsheet formula provided by the first user.

5. The computer-implemented method of claim 4, wherein entering the cell formula into the extra row further includes automatically applying a formula for calculated cells reflected dynamically in the other row.

6. The computer-implemented method of claim 1, wherein entering the cell formula into the extra row includes automatically applying a formula for calculated cells reflected dynamically in the other row.

7. One or more tangible, non-transitory computer-readable media containing computer-executable instructions that, when executed by a processor, cause the processor to perform the computer-implemented method of claim 1.

* * * * *